June 9, 1925.  1,541,035
G. J. EVANS
SIGNAL FOR AUTOMOBILES
Filed Aug. 17, 1923  2 Sheets-Sheet 1
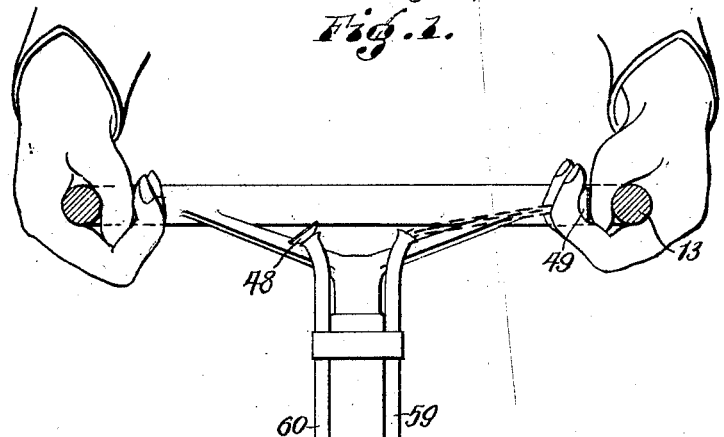
Fig. 1.
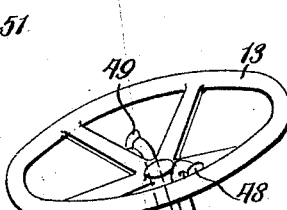
Fig. 2.
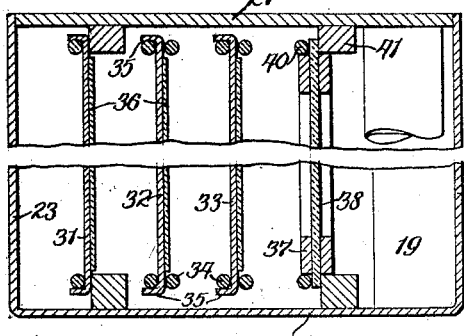
Fig. 6.
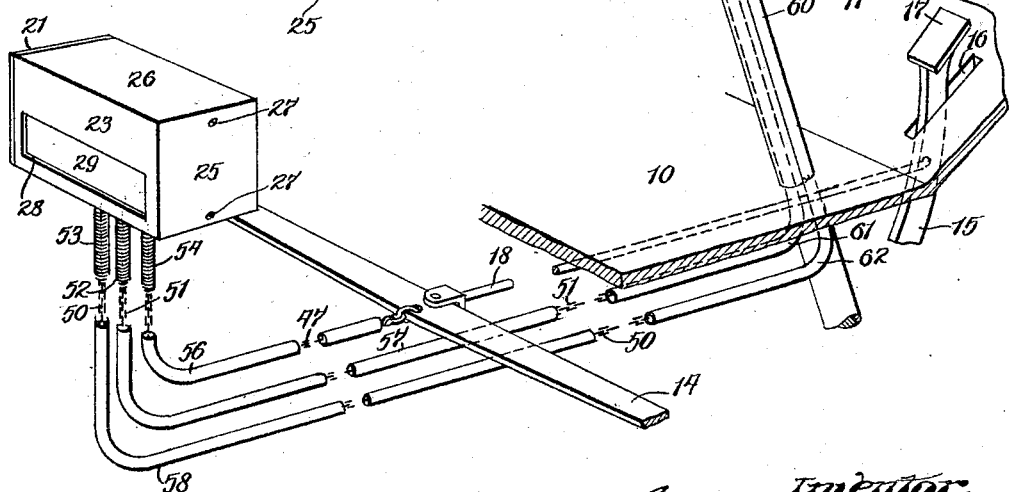
Inventor.
Guy J. Evans
by Popp & Powers
Atty.

June 9, 1925.
G. J. EVANS
1,541,035
SIGNAL FOR AUTOMOBILES
Filed Aug. 17, 1923
2 Sheets-Sheet 2
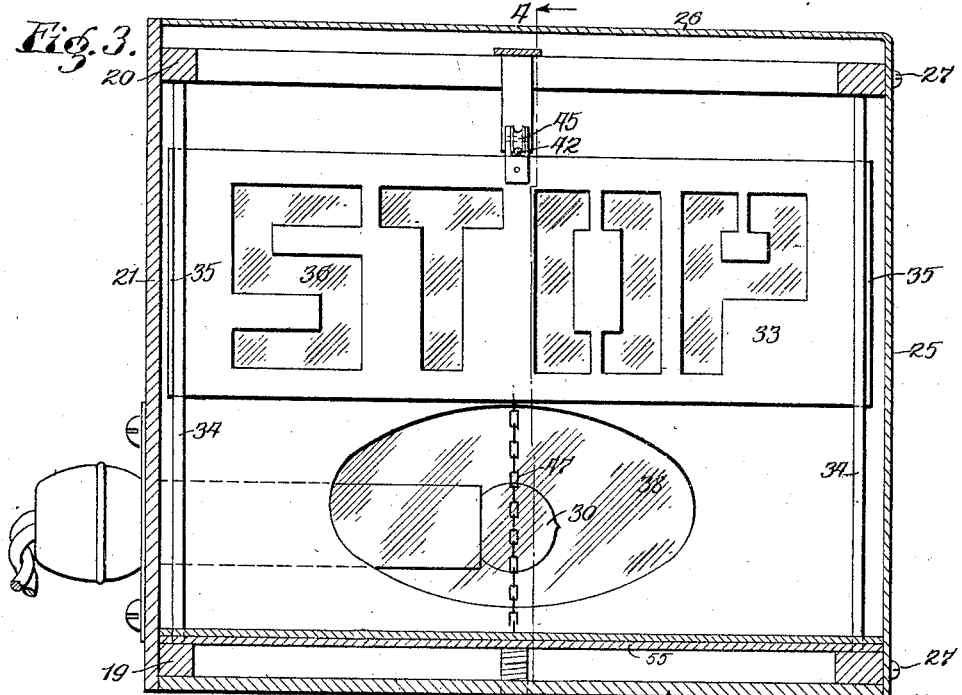
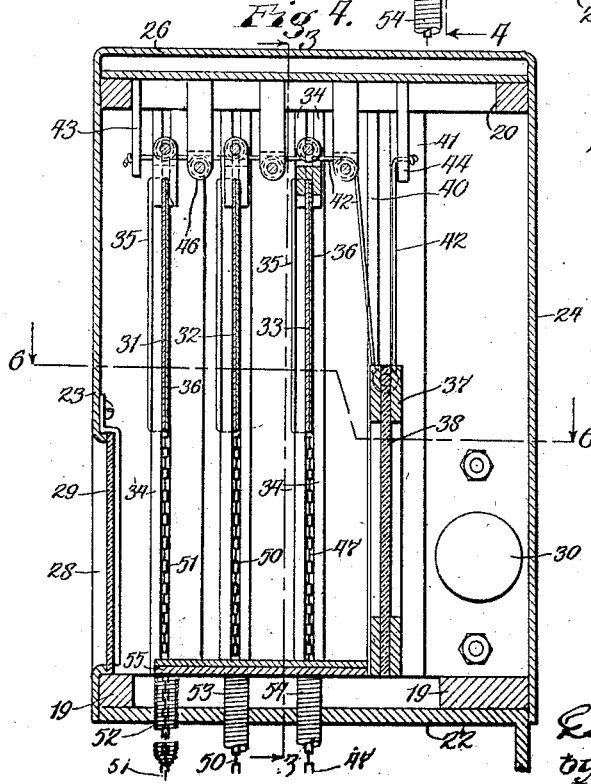
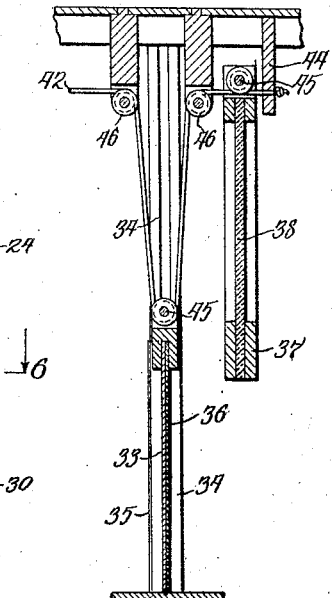

Patented June 9, 1925.

1,541,035

UNITED STATES PATENT OFFICE.

GUY J. EVANS, OF BUFFALO, NEW YORK.

SIGNAL FOR AUTOMOBILES.

Application filed August 17, 1923. Serial No. 657,917.

*To all whom it may concern:*

Be it known that I, GUY J. EVANS, a citizen of the United States, residing at Buffalo, in the county of Erie and State of New York, have invented a new and useful Improvement in Signals for Automobiles, of which the following is a specification.

This invention relates to a signal which is more particularly designed for use on automobiles in order to enable the driver to notify persons in the vicinity of the automobile as to whether the driver intends to turn to the right or to the left or is coming to a stop, it being obvious however that this device can be used in other installations where similar conditions exist.

It is the purpose of this invention to provide a signal of this character which can be readily installed and easily manipulated and which is so designed that it is impossible to give more than one indication at a time and thereby avoid confusion in the giving of the signal.

In the accompanying drawings: Figure 1 is a sectional elevation of the steering wheel of an automobile driving mechanism showing the same equipped with a part of my invention and illustrating the manner in which the same is operated by the hands of the driver while grasping the steering wheel. Figure 2 is a fragmentary sectional perspective view of the steering and brake mechanism of an automobile equipped with my improvements. Figure 3 is a vertical transverse section of the indicator portion of the signal embodying my improvements, the section being taken on line 3—3 of Figure 4. Figure 4 is a vertical longitudinal section taken on line 4—4 of Figure 3. Figure 5 is a fragmentary view similar to Figure 4 showing one of the indicator members in its depressed or operative position and the combined indicator and return member in its elevated position. Figure 6 is a fragmentary horizontal section taken on line 6—6 of Figure 4.

Similar characters of reference indicate corresponding parts throughout the several views.

My improved signal may be varied in its details of construction and still embody my invention and the same may also be mounted on automobiles of which vary in design and only those parts of an automobile have therefore been shown which will serve to illustrate the application of my invention. The parts of the automobile as there shown comprise a body having a bottom 10 and a foot board 11 arranged at an angle at the front end of the bottom, an upright steering post 12 which forms part of the steering mechanism of the automobile and is provided at its upper end with a steering wheel 13 adapted to be grasped on transversely opposite sides by the hands of the driver, a brake lever 14 arranged underneath the body and adapted to operate the brake bands or similar mechanism of the automobile, and a foot brake lever 15 projecting upwardly through a slot 16 in the foot board and provided at its upper end with a twill 17 and connected below the foot board with the brake lever 14 by means of a brake rod 18.

In its general organization the signal embodying my improvements comprises an indicator section which may be mounted on any suitable part of the car so as to indicate to persons nearby the intention of the driver as to whether he will turn to the right, or to the left or will come to a standstill, and manual controlling mechanism which extends from a point adjacent to the steering wheel to the indicating mechanism whereby the indicating portion of the mechanism is set to give the desired signal.

The indicating portion of the signal in its preferred form, as shown in Figures 2 to 7, is constructed as follows:

Mounted on a suitable part of the automobile, for instance the rear portion of the body, is a frame upon which the working parts of the indicator mechanism is mounted and which preferably comprises a base 19, an upper head 20, and a longitudinal side wall 21 connecting the base and head with the corresponding longitudinal edges of the same. This frame is mounted on a bracket 22 which may be secured to any available part of the automobile, such as the rear part of the body, or the front and rear fenders of the same. Upon this frame is a removable shell section which together with the frame forms the enclosing casing of the indicator mechanism, which shell in its preferred form as shown in the drawings, comprises a front wall 23 adapted to engage the transverse front edges of the base 19 and head 20 and the front edge of the side wall 21, a rear wall 24 adapted to engage the rear transverse edges of said base and head and the rear upright edge of the fixed side wall 21, a removable longitudinal side wall 25 connecting the corresponding upright edges of the front and rear walls 23 and 24 opposite to the side wall 21 and engaging its lower edge with the corresponding longitudinal edge of the base 19, and a top 26 extending over the head 20 and connected with the upper edges of the walls 23, 24 and 25 and bearing against the upper portion of the wall 21. This removable section or shell of the enclosing casing may be detachably connected with the fixed or immovable portion of the casing in any suitable manner, for instance by means of screws 27 connecting the longitudinal side wall 25 with the base and head of the frame, as shown in Figure 3, thereby rendering the interior of the casing accessible for inspecting, adjusting and repairing the movable parts of the indicator mechanism which are mounted on the frame of the same.

On the lower part of the front wall 23 of the enclosing casing is arranged a sight opening 28 through which the indicator members arranged within the casing are visible from the exterior of the casing, which sight opening is preferably covered by a transparent pane 29 of uncolored glass or similar material. Within the rear lower part of the enclosing casing and in line with the sight opening 28 is arranged a lamp 30 preferably in the form of an incandescent electric bulb which is mounted on the wall 21 and is supplied with an electric current in any suitable and approved manner so that when the current is turned on the light of this lamp will illuminate the interior of the signal casing and shine through the sight opening 28.

Within the enclosing casing are mounted a plurality of indicator members, any one of which is movable into and out of the position across the sight opening and the rays of light from the lamp so that these indicator members may be visible either in the daytime or during the night-time and may be utilized to notify persons adjacent to the signal as to the intentions of the driver of the vehicle.

In the construction shown four of such indicator members are employed, three of them being constructed to serve simply as indicating members while the fourth one is constructed to serve the double purpose of an indicating member and a return member as will hereinafter appear. In the preferred construction these indicator members are arranged in a longitudinal row within the enclosing casing and so mounted that they are capable of moving vertically therein for the purpose of moving any one of the indicator members downwardly between the sight opening and the lamp or upwardly into a position where the same clears the sight opening and lamp and is concealed within the upper imperforate part of the enclosing casing. The three plain indicator members in the preferred construction are arranged one behind the other within the front part of the enclosing casing while the combined indicating and return member is arranged within the rear part of this casing and forms the rearmost of the row of indicator members. The body portions of the plain indicator members are constructed of upright plates of metal 31, 32, 33 which are arranged transversely within the casing and are guided at their opposite ends by means of pairs of upright rods 34 which are mounted at their upper and lower ends on the upper and lower longitudinal edge portions of the base 19 and head 20 of the main frame, each of these signal plate bodies being arranged with its opposite vertical edge portions between two pairs of such guide rods and provided with upright flanges 35 which engage with the outer sides of the respective guide rods 34 and thereby hold the signal plate against transverse displacement within the casing. These several signal plate bodies may be provided with any suitable indicia according to the signal to be given. For instance the signal plate next to the front wall 23 may be perforated or cut out in the form of a stencil so as to form the word "Left," the next following signal plate body may be provided with perforations or stencil formation representing the word "Right" and the third or last one of the series may be provided with perforations or with stencil slots representing the word "Stop," as shown in Figure 3. When any one of these plain signal plates is in its elevated position within the casing the same cannot be observed from the exterior of the same, but upon lowering the same into the space between the sight opening 28 and the signal lamp 30 this signal plate plate can be observed from the exterior of the casing either during the daytime or night-time, particularly when the lamp 30 is illuminated and thereby notify persons in the vicinity that the driver intends to operate his vehicle in accordance with the particular signal plate which has been lowered into its operative position. In the preferred construction the perforated or slotted indicia on each of the signal plates is preferably covered by transparent material such as a sheet 36 of celluloid of an appropriate color.

The combined indicator and return member is preferably constructed in the form of a frame 37 which is heavy and preferably made of metal, and a transparent pane 38 of glass or similar material which is mounted within this frame and colored red. Upon lowering this frame into a position in which it is arranged between the sight opening and the signal lamp the light of the latter shining outwardly through the pane of the indicator and return member will serve as a danger or warning signal and take the place of an ordinary tail-light such as are usually employed on the rear end of an automobile, but when this combined indicator and return member is elevated, its service as a signal is discontinued inasmuch as it is not visible from the exterior of the casing and the light of the lamp cannot shine outwardly through the same. This combined indicator and rear member is guided in its vertical movements within the enclosing casing by engaging the opposite reduced ends 39 of the frame of this indicator between pairs of posts 40, 41, one of which preferably 40, is constructed in the form of a rod similar to the rods 34, while the other 41, is preferably constructed in the form of an upright bar which is secured at its upper and lower ends to the base 19 and head 20 of the main frame.

Means are provided which are manually controlled whereby any one of the indicator members may be moved into its lowered or operative position or raised into its elevated inoperative position, which means are so constructed that the depression of one of the indicator members will cause an elevation of all the other indicator members and prevent the depression of more than one indicator member at a time. The preferred form of these means, as shown in the drawings are constructed as follows:

42 represents a controlling member or line which is preferably constructed in the form of a flexible strap, cord or chain and which has its opposite ends fixed while its intermediate part is operatively connected to the several indicator members so that upon depressing any one of these indicator members a downwardly projecting loop will be formed in the intermediate part of the controlling member by the respective indicator member while the remaining indicator members will be elevated. In the construction shown in the drawings the controlling member has the form of a line or cord which is secured at its opposite ends to outer and inner hangers 43, 44, depending from the head of the frame while the intermediate parts of this controlling member pass alternately underneath rollers 45 mounted on the upper ends of the indicator members and over rollers 46 mounted on the upper head 20 of the main frame, as shown in Figure 4. The length of this controlling member or line is so determined that there is only sufficient slack in the same to permit of depressing or lowering one indicator member at a time into its operative position. As shown in Figure 4 the innermost or combined indicator and return member is thus shown in its lowermost position so that the same forms a downwardly deflected loop in the controlling member which causes the remaining portion of this controlling member to be drawn taut so that that portion of the controlling line or member in front of the downwardly deflected rear part thereof is straight and in a horizontal position and holds the plain indicator members in elevated position.

Upon the downward movement of any one of the indicator members a previously depressed indicator member will be elevated and will produce another downwardly deflected loop in the controlling member thereby causing the previously formed loop therein to be eliminated and the indicator member supported thereon to be elevated. An example of such an operation is shown in Figure 5 in which the third indicator member inwardly from the wall 23 has been lowered into its operative position so as to cause the same to form a downwardly deflected loop in the controlling member which in turn causes that part of the controlling member in rear of this loop to be straightened out or drawn taut and cause the combined indicator and return member to be elevated.

The plain indicator members 31, 32, 33 are adapted to be pulled down by manually operated means while the combined indicator and return member is made sufficiently heavy so that when the same is free it will descend into its operative position by gravity and will cause the elevation of any one of the plain indicator members which may have been previously depressed, while the depression of any one of the plain indicator members by manual power will cause the elevation or raising of the combined indicator and return member into its elevated position. Although various means may be employed for depressing one or the other of the plain indicator members those shown in the drawings are so organized that a manual selection of the desired signal plate may be made which are under the control of the operator or driver at the front end of the car and enable him to depress whichever signal or indicator plate to suit his purpose.

In its preferred form this manual control means is constructed as follows:

47 is a flexible line of any suitable character such for instance as a chain which is connected at one end with the brake lever 14 and at its other end with the body of the signal member bearing the word "Stop." Upon operating the brake mechanism in any manner, for instance by means of the foot lever 15 so as to produce a downward pull upon the line 47 the "stop" signal plate will be depressed into its lowermost position so that the same is in line with the sight opening 28 and the lamp 30. This operation will cause the combined indicator and return member 38 to be elevated, as indicated in Figure 5, so that upon subsequently releasing the brake mechanism the combined indicator and return member 38 will cause the "stop" indicator plate to be again elevated into its inoperative position.

Adjacent to the right and left inner side portions of the steering wheel 13 are arranged two finger pieces or handles 48 and 49 which are adapted to be grasped by the fingers of the right and left hand, respectively, and to be moved outwardly by the same toward the inner side of the steering wheel for the purpose of setting the signal so as to indicate that the driver intends to turn either toward the right or toward the left. The right-hand finger piece 48 is connected by a flexible line such as a chain 50 with the lower edge of the "right" indicator plate 32 so that upon drawing this finger piece outwardly toward the steering wheel the "right" signal plate will be drawn downwardly into its operative position. In a similar manner the left-hand finger piece 49 is connected by means of a flexible line 51, such as a chain with the lower edge of the "left" signal plate so that upon drawing the finger piece 49 outwardly toward the steering wheel 13 this signal plate will be moved downwardly into its operative position. As previously explained, the depression of any one of the indicator members into its operative position will produce an elevation of the remaining indicator members, this being due to the fact that there is only sufficient slack in the controlling member 42 to permit of but one of these indicating members at a time. It follows from this that if an attempt should be made to operate the brake mechanism and also pull both of the finger pieces 48 and 49 outwardly at the same time or to attempt to operate any two of the plain signal members at the same time by manual means that this would be impossible and instead only a partial downward movement of these several members would be permitted by reason of the insufficient slack in the controlling member, thereby preventing the giving of a confusing signal. It would be apparent however that whenever one or the other of the "stop," "right" or "left" signal plates is depressed by manual means and thereafter released, that whichever plain signal member has been depressed will be automatically returned to its elevated position by the weight of the combined indicator and return member 38, while the latter moved into its normal or depressed position. Whenever therefore the "stop," "right" or "left" signal plates are automatically returned to their inoperative positions, the combined indicator and return member which serves as a tail-light or signal is automatically substituted for these direction signals.

As the signal plates 31, 32 and 33 are elevated into their inoperative positions the same pull the operating lines 51, 50 and 47 backwardly so that there is sufficiently no slack in these lines between the finger pieces and the foot lever with which they are connected. The return of the pull lines 50, 51 also operates to draw the finger pieces 48 and 49 inwardly or away from the inner side of the steering wheel 13. The return of these lines so as to permit the signal plates 31, 32 and 33 to ascend and the tail-light signal to descend is preferably accomplished by three coil springs 52, 53 and 54 which surround those portions respectively of the pull lines 51, 50 and 47 adjacent to the lower part of the enclosing casing and pass through the latter and each of which is connected at its upper end with a base plate 55 arranged in the lower part of the casing while the lower end of each spring is connected with an adjacent part of the respective pull line, as shown in Figures 2 and 4. It follows from this that whenever one of the pull lines is drawn downwardly the respective spring will be stretched and upon releasing the pull upon this line the same will be drawn backwardly by its companion spring and thus enable the plain signal plate to be raised promptly by the weight of the tail-light signal which operates as a combined indicator member and return member. Any suitable means may be provided for guiding those portions of the pull line between the part which actuates the same and the return springs. For instance this may be accomplished by passing those portions of the pull line which are arranged underneath the body of the car in guide tubes 56, 57 and 58 which are suitably mounted on the adjacent stationary part of the car body. Those portions of the chains or lines 50, 51 extending from the underside of the car body to the finger pieces 48, 49 are preferably arranged adjacent to the steering post or column and are passed through guide tubes 59 and 60 mounted on the adjacent parts of this post or column. Those parts of the pull lines or chains 50, 51 which make a turn from the steering post to the under side of the car body may be passed through curved tube portions 61, and 62 which connect the lower ends of the tubes 59 and 60 with the front ends of the tubes 57 and 58, respectively. If desired however any other suitable means may be provided for transmitting the motion of the finger operated members adjacent to the steering wheel to the signal plates which form part of the indicator section of the apparatus.

This signal mechanism can be applied to the standard types of automobiles now in common use without requiring any alteration in the construction thereof at comparatively low cost and without interfering with any of the parts now present on the car. The same is very simple in construction and reliable in operation and permits of giving the proper signal to persons on the roadway without the possibility of an error and thereby preventing confusion and avoiding accidents which otherwise might result.

I claim as my invention:

1. A signal for automobiles and etc., comprising a casing provided with a sight opening, an indicated member arranged in said casing and movable into and out of a position across said opening, a return member movable normally into its operative position, manually operated means for moving said indicator member across said opening, and automatic means for moving said indicator member out of line with said opening when the return member moves to its normal position, comprising a flexible controlling member having its ends fixed while its intermediate part is operatively connected with said return member and indicator member and adapted to have portions thereof deflected into loops upon moving said members relatively to one another.

2. A signal for automobiles and etc., comprising a casing provided with a sight opening, an indicator member arranged in said casing and movable into and out of a position across said opening, a return member tending constantly to move in one direction, and shifting means for moving said return member in the opposite direction upon moving said indicator member into a position across said opening, comprising a flexible controlling member having its ends fixed while its intermediate part is operatively connected with said return and indicator members and adapted to having portions thereof deflected into loops upon moving said members relatively to one another.

In testimony whereof I affix my signature.

GUY J. EVANS.